United States Patent [19]

Klatt et al.

[11] Patent Number: 5,057,025

[45] Date of Patent: Oct. 15, 1991

[54] DISPLAY CONTACTS

[75] Inventors: Dieter Klatt, Wülfrath; Dirk Pellizari, Wuppertal, both of Fed. Rep. of Germany

[73] Assignee: Stocko Metallwarenfabriken Henkels und Sohn GmbH & Co., Wuppertal, Fed. Rep. of Germany

[21] Appl. No.: 571,297

[22] Filed: Aug. 22, 1990

[30] Foreign Application Priority Data

Aug. 23, 1989 [DE] Fed. Rep. of Germany ....... 3927752

[51] Int. Cl.$^5$ .............................................. H01R 9/09
[52] U.S. Cl. ...................................... 439/71; 439/733; 439/65
[58] Field of Search .................... 439/65, 66, 68, 71, 439/72, 73, 74, 78, 733

[56] References Cited

U.S. PATENT DOCUMENTS

| 4,620,761 | 11/1986 | Smith et al. ...................... 439/71 X |
| 4,640,562 | 2/1987 | Shoemaker . |
| 4,645,287 | 2/1987 | Olsson . |
| 4,648,666 | 3/1987 | Lovell .................................... 439/71 |
| 4,830,623 | 5/1989 | Owens et al. ........................ 439/71 |
| 4,857,001 | 8/1989 | Nakano et al. .................. 439/733 X |
| 4,859,189 | 8/1989 | Petersen et al. .................. 439/71 X |

FOREIGN PATENT DOCUMENTS 2755254 6/1978 Fed. Rep. of Germany .
8705715 4/1987 Fed. Rep. of Germany .

Primary Examiner—Larry I. Schwartz
Assistant Examiner—Kheim Nguyen
Attorney, Agent, or Firm—Robert W. Becker & Associates

[57] ABSTRACT

A display contact arrangement for the contacting of electrical contacts of a display element, for example, for a strip-shaped LCD display or a planar-shaped LCD monitor, with the corresponding electrical contacts of a circuit board via an insulator body. The rigid strip-shaped plastic insulator body, in its longitudinal direction, has arranged alternatingly and staggered on each side wall leaf springs serving as electrial leads. The display element rests on the upper bent ends of the leaf springs, thereby making contact. The leaf springs are connected to the electrical leads of the circuit board either by SMD technique or by soldering.

11 Claims, 2 Drawing Sheets

DISPLAY CONTACTS

BACKGROUND OF THE INVENTION

The present invention relates to a device for the electrical contacting of electrical contacts of a display element, which are arranged in a row next to each other, for example, for a strip-shaped LCD display or a planar-shaped LCD monitor, with the corresponding electrical contacts of a circuit board or other carrier plates while being mechanically fixed simultaneously, and having a strip-shaped insulator body, which has arranged on or inside of it parallel electrical leads, which, with one end, are electrically contacting the corresponding contact of the circuit board or other carrier plates, and on which, on the other end, the respective contacts of the display element are resting via spring means while also electrically contacting, and having a press-on frame for the mechanical fixation of the display element.

Display elements are being used in various electronic apparatuses. Such display elements are, for example, LCD displays for electric typewriters, planar-shaped LCD monitors for audio/video equipment and video game computers, portable personal computers (lap tops) and so on.

A device of the described kind for the electrical contacting of electrical contacts, arranged in a row next to each other, of a display element in the form of a liquid crystal display for a quartz watch has been known from DE-OS 27 55 254. For this purpose, there is arranged on both sides of the display element a strip-shaped insulator body in which parallel electrical leads are imbedded. The free ends of the electrical leads extend past the insulator body, and the display element rests, supported by a spring action, on the electrical leads thereby making electrical contact. The final mechanical fastening of the display element is then achieved via the press-on frame of the watch casing.

In this known electrical contacting device for display elements contacting problems occur when the grating line distance between the electrical contacts of the display element becomes too small, for example, when the distance is only 0.35 mm. The distance of the electrical leads on the insulator body may not be reduced to any desired value since a minimum distance is required to avoid closing of the circuit between the leads.

A contacting device for LC displays is known from DE-GM 87 05 715. For this purpose, a frame is disposed on a circuit board. The display element is arranged on the frame. In order to make contact between the electrical contacts of the display element with the respective leads of the circuit board, contact springs are arranged next to each other in a row, which are held by contact spring holders and the free ends of which are disposed on top of the respective electrical contacts of the display element. In this device the grating line distance of the electrical leads is also limited, because all electrical wires are arranged next to each other and therefore require a minimum distance between them.

Considering the electrical contacting device of the described prior art, it is therefore an object of the present invention, to provide a secure contacting of the electrical contacts of the display element with the electrical leads of the insulator body, even at very small distances between the electrical contacts.

SUMMARY OF THE INVENTION

As a technical solution it is suggested with the present invention, that the electrical leads are arranged in an alternating and staggered fashion on the one or the other side wall of the strip-shaped insulation body in its longitudinal direction.

A device according to the present invention for the electrical contacting of the electrical contacts of a display element is advantageous in that display elements with a small grating line distance of, for example, 0.35 mm may be contacted without problem with the electrical leads of the strip-shaped insulator body, because the distance of the electrical leads on each respective side wall of the insulation body corresponds to twice the grating line distance.

In a preferred embodiment, the strip-shaped insulator body has an essentially rectangular or trapezoidal cross-section, whereby the trapezoidal cross-section is preferred.

Preferably the electrical leads are fixed to the insulator body by gluing or wedging. However, when the insulator body consists of a plastic material, it is also possible to imbed the electrical leads in the insulator body during an injection molding step.

In a preferred embodiment the electrical leads are formed as leap springs or wire springs. They are bent preferably in the area of the display element such, that the display element is resting in a spring action on the outer curvatures. Thereby a technically simple electrical lead is formed, which also reliably assures the electrical connection between the electrical contacts of the display element on the one hand and the circuit board on the other hand. The leaf springs especially have excellent spring properties to optimize the electrical contact with the respective electrical contacts of the display element. This is also true for the springs bent from wire, which have the additional advantage that they may be easily manufactured.

In a first alternative embodiment concerning the fixation of the insulator body and its electrical leads to the circuit board, the one ends of the electrical leads are passed through a perforation in the circuit board and are soldered to the circuit board. With this soldering process it is possible to use circuit boards which are laminated on one side. By this soldering step the insulator strip as well as all other electronic parts of the circuit board may be contacted.

In a second alternative the one ends of the electrical leads each are respectively fastened to the circuit board by the SMD technique (surface mounting technology). This also assures a safe contacting and fixation to the circuit board.

BRIEF DESCRIPTION OF THE DRAWINGS

Two embodiments of the device of the present invention for the electrical contacting and the fixation of a display element on a circuit board will be described in the following paragraphs with the aid of the schematic drawings. The drawings are.

DESCRIPTION OF PREFERRED EMBODIMENTS

Figure 1:
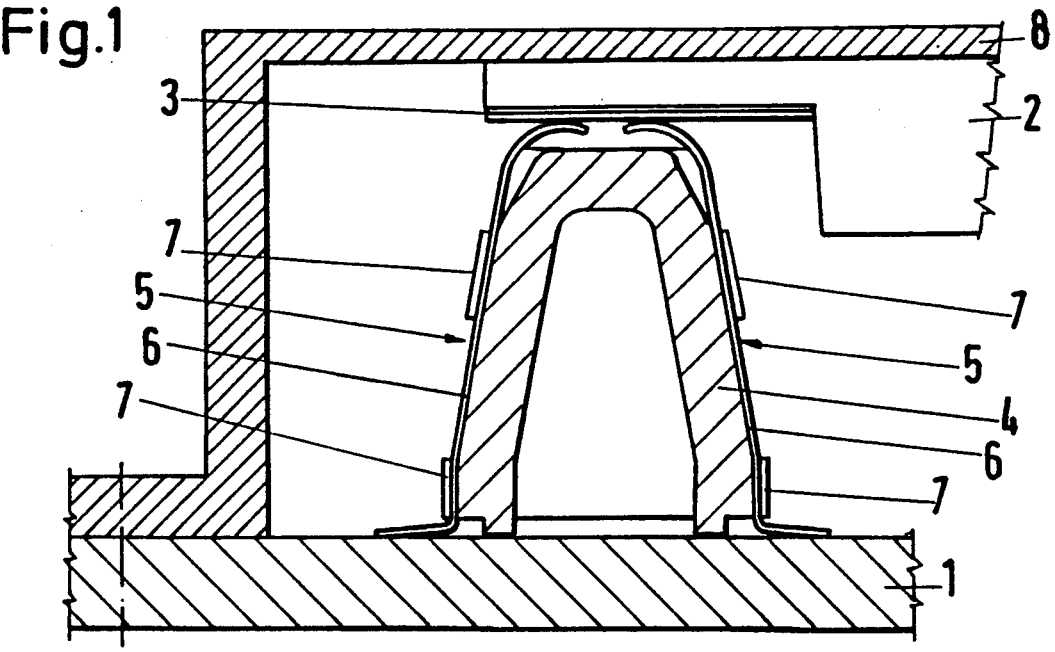
FIG. 1 a schematic cross-sectional view of a first embodiment of the device.
Figure 2:
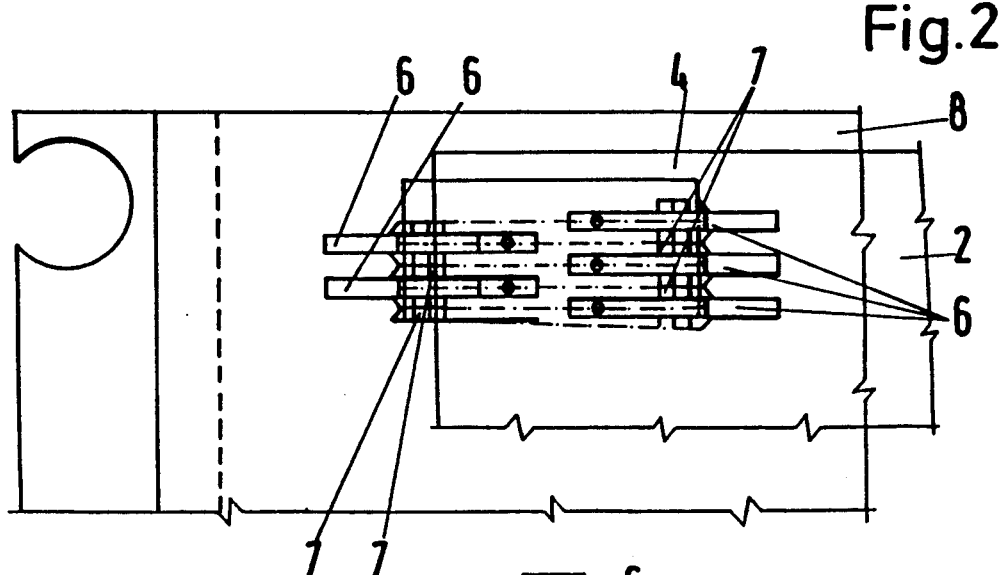
FIG. 2 a schematic top view of the device of FIG. 1.
Figure 3:
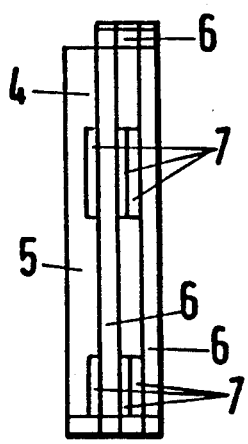
FIG. 3 a schematic side view of the strip-shaped insulator body, which has leaf springs arranged at the side walls of the device of FIG. 1.
Figure 4:
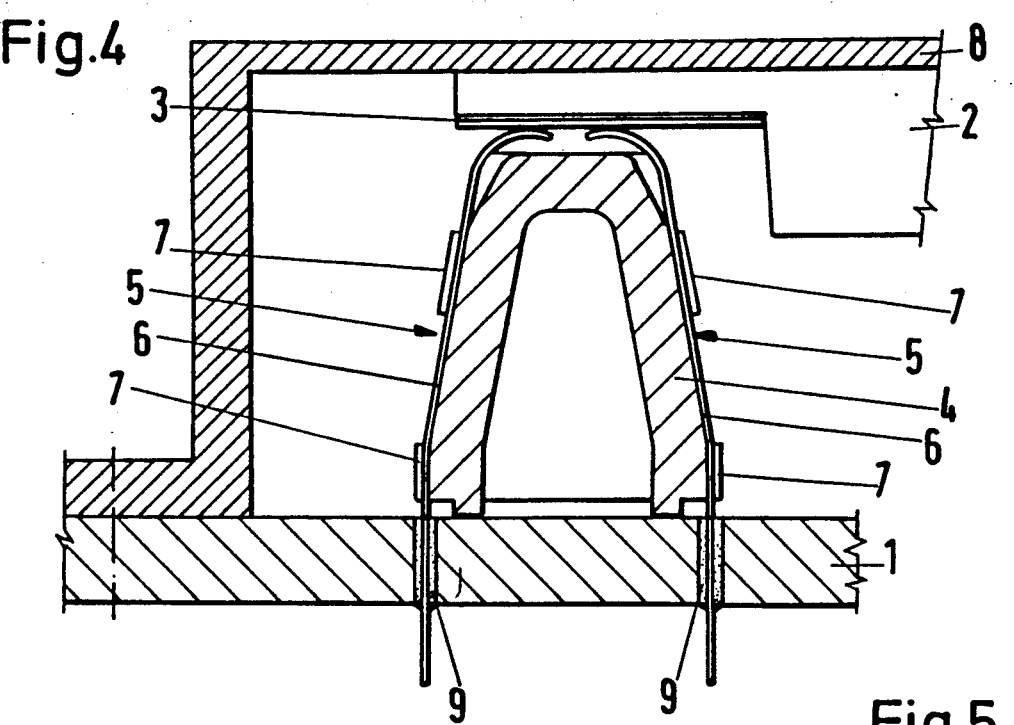
FIG. 4 a schematic cross-sectional view of a second embodiment.
Figure 5:
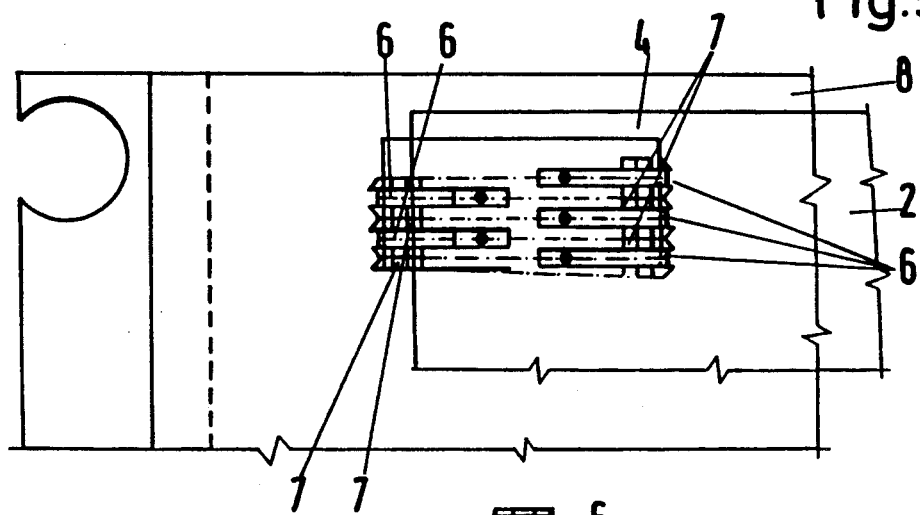
FIG. 5 a schematic top view of the device of FIG. 4.
Figure 6:
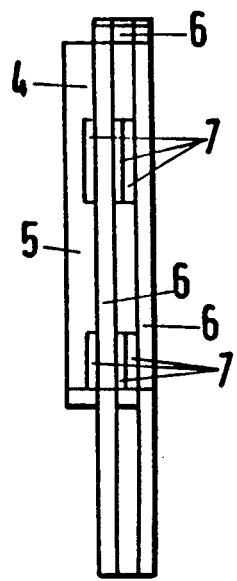
FIG. 6 a schematic side view of the strip-shaped insulator body, which has leaf springs arranged at the side walls of the device of FIG. 4.

FIGS. 1 through 3 represent a first embodiment, and FIGS. 4 through 6 show a second embodiment of a device for the fixation and electrical contacting of a display element to a circuit board.

In the first embodiment a display element 2 is mechanically fixed and especially electrically contacted to a circuit board 1. For this purpose, the circuit board 1 is equipped with electrical contacts on its upper side in the form of electrical leads (not represented in the drawing). The display element, on its bottom side, is provided with corresponding electrical contacts 3 in the form of electrical leads, which are arranged parallel and in the longitudinal direction of the display element 2, so that they correspond to the electrical leads of the circuit board 1 below.

In order to make contact between the electrical leads of the circuit board 1 on the one hand and the electrical leads of the display element 2 on the other hand, a strip-shaped insulator body 4 is provided which has basically a trapezoidal cross-sectional profile. Onto the side walls 5 of the insulator body 4, which is preferably manufactured from plastic, electrical leads in the form of leaf springs 6 ar fastened. The leaf springs 6 are arranged parallel to each other and are fixed to the side walls 5 of the insulator body 4 by protrusions 7, provided at the insulator body 4, between which the leaf springs are pressed. The fixation of the leaf springs 6 to the insulator body 4 is a particularity, because the leaf springs 6 are fixed in an alternating and staggered fashion to the one or the other side wall 5 of the insulator body 4 such, that the distance between the leaf springs 6 on each side wall 5 corresponds to twice the grating line distance, whereby the width of the leaf springs 6 may be approximately as wide as the grating line distance, without two neighboring leaf springs 6 ever touching. It is important that the upper bent sections of the leaf springs 6 do not overlap or intermesh but have a strip-shaped distance to each other, as shown in the top view of FIG. 3.

The fixation of the leaf springs 6 and therewith of the insulator body 4 onto the circuit board 1 by respective electrical contacting of the electrical leads on the circuit board 1 is achieved by the so-called SMD technique, whereby, for this purpose, the lower ends of the leaf springs 6 are bent outward. As can be seen in FIG. 1, the upper ends of the leaf springs 6 are bent to an arched shape. The electrical contacts 3, in the form of electrical leads, of the display element 2 rest on these arches of the leaf springs 6 such that these electrical leads are positioned exactly on the corresponding leaf springs 6 which are to be contacted. The electrical contact between the electrical contacts 3 of the display element 2 via the leaf springs 6 to the electrical leads of the circuit board 1 is thereby achieved.

For the fixation of the display element 2, a press-on frame 8 is used, which has a cut-out section in its center. This press-on frame 8 presses the display element 2 downward against the force of the leaf springs 6. The fixation of the press-on frame 8 on the circuit board 1 may than be achieved by screwing.

In the second embodiment according to FIGS. 4 through 6, a similar arrangement is provided. The only difference to the first embodiment represented in FIGS. 1 through 3 is the contacting of the leaf springs 6 on the circuit board 1. Instead of the SMD technique, a soldering technique is employed, whereby, for this purpose, the circuit board is equipped with perforations 9, through which the lower ends of the leaf springs 6 are passed, which serve as soldering tabs and are soldered to the circuit board 1.

The present invention is, of course, in no way restricted to the specific disclosure of the specification and drawings, but also encompasses any modifications within the scope of the appended claims.

What we claim is:

1. A display contact arrangement, comprising a display element with electrical contacts, which are arranged in a row next to each other, and a circuit board with corresponding electrical contacts; and an insulator body having side walls, at which are disposed parallel electrical leads, said electrical leads being arranged in an alternating and staggered fashion in a longitudinal direction relative to one another on said side walls of said insulator body and, with one end thereof, are in electrical contact with said corresponding contacts of said circuit board, and on which, on the other end thereof, respective contacts of said display element are resting in a resilient manner; and a press-on frame, which fixed, by mechanical means, said display element onto said insulator body; said display contact further comprising:

said other ends of said electrical leads that contact said display element being arranged such that said ends of a first row and said ends of a second row do not intermesh with one another, with a strip-shaped space being provided between said first and said second row.

2. A display contact arrangement according to claim 1, in which said insulator body has an essentially rectangular cross-section.

3. A display contact arrangement according to claim 1, in which said electrical leads are glued onto said insulator body.

4. A display contact arrangement according to claim 1, in which said electrical leads are formed as leaf springs.

5. A display contact arrangement according to claim 1, in which said one ends of said electrical lead are passed through perforations of said circuit board and are soldered to said circuit board.

6. A display contact arrangement according to claim 1, in which said one ends of said electrical leads are fixed to said circuit board by SMD technique.

7. A display contact arrangement according to claim 1, in which said electrical leads are arranged on said insulator body.

8. A display contact arrangement according to claim 1, in which said electrical leads are arranged inside said insulator body.

9. A display contact arrangement according to claim 1, in which said insulator body has an essentially trapezoidal cross-section.

10. A display contact arrangement according to claim 1, in which said electrical leads are wedged onto said insulator body.

11. A display contact arrangement according to claim 1, in which said electrical leads are formed as wire springs.

* * * * *